(12) United States Patent
Rembold et al.

(10) Patent No.: US 7,301,749 B2
(45) Date of Patent: Nov. 27, 2007

(54) DEVICE AND METHOD FOR TRIGGERING AN INDUCTOR

(75) Inventors: Helmut Rembold, Stuttgart (DE); Juergen Eckhardt, Markgroeningen (DE); Bernd Schroeder, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 393 days.

(21) Appl. No.: 11/171,099

(22) Filed: Jun. 29, 2005

(65) Prior Publication Data

US 2006/0007628 A1    Jan. 12, 2006

(30) Foreign Application Priority Data

Jul. 7, 2004   (DE)   ............ 10 2004 032 721

(51) Int. Cl.
*H02H 47/00* (2006.01)
(52) U.S. Cl. ........................... 361/160
(58) Field of Classification Search ............. 361/160
See application file for complete search history.

(56) References Cited

U.S. PATENT DOCUMENTS 4,779,034 A * 10/1988 Shepard, Jr. ............... 318/804
6,184,660 B1 * 2/2001 Hatular ....................... 320/141

FOREIGN PATENT DOCUMENTS

DE        42 22 650        1/1994

* cited by examiner

*Primary Examiner*—Stephen W. Jackson
(74) *Attorney, Agent, or Firm*—Kenyon & Kenyon LLP

(57) ABSTRACT

A device and method for triggering an inductor having a trigger circuit and a first and second extinguishing device, the trigger circuit triggering a switch element, which establishes or interrupts a current flow to the inductor, the trigger circuit, in the interruption of the current flow to the inductor, initially operating the first extinguishing device, and, following a free-wheeling extinction time, which does not fall below a minimum time, operating the second extinguishing device, the first and second extinguishing devices extinguishing a current induced in the inductor, and the second extinguishing device extinguishing the induced current more rapidly than the first extinguishing device.

15 Claims, 2 Drawing Sheets

DEVICE AND METHOD FOR TRIGGERING AN INDUCTOR

FIELD OF THE INVENTION

The present invention relates to a device for triggering an inductor, particularly a solenoid valve in a fuel supplying device. Furthermore, the present invention relates to a method for triggering an inductor as well as a circuit configuration for applying the method.

BACKGROUND INFORMATION

In a pulse output stage, the solenoid valve is activated by a voltage pulse, which sets a specific output volume of the pumping device. During the triggering, a magnetic force builds up, which acts against a spring force. As soon as the magnetic force is greater than the spring force, the magnet armature moves and the valve is switched.

Following the trigger pulse, the magnetic force must be extinguished again so that the magnet armature returns to the starting position. Only when the magnetic force is smaller than the spring force can the magnet armature be released. In the ideal case, the current returns to zero during the extinguishing process before the next trigger pulse occurs. This time interval between the complete extinction and the next trigger pulse has the advantage that the starting conditions for a switching pulse are always the same. If the current does not return completely to zero in the available time, then the current can build up over several periods. In the worst case this can result in a function of the solenoid valve being no longer ensured due to a residual magnetic force. Furthermore, the valve is thermally more highly stressed by this current buildup and may be destroyed.

Hence, the energy built up in the magnetic field during triggering should necessarily be extinguished completely in the available time. Depending on the extinction voltage, the energy stored in the magnetic field is proportionately converted in the coil or in the suppressor diode. In the case of a 0V extinction voltage, the extinguishing process theoretically takes an infinite amount of time, the energy being completely converted in the coil. At an infinitely high extinction voltage, the current decay time tends toward zero, for the energy is converted completely at the extinguishing element.

In today's pulse output stages, extinction occurs via a free-wheeling diode. Since the extinction voltage of the free-wheeling diode is relatively low (approximately 0.6 to 0.8 V), the current or energy decay occurs accordingly slowly. For this reason, free-wheeling diodes are principally used only for long switching periods.

A method for triggering an electromagnetic load is described in German Patent Application No. DE 42 22 650, in which the electrical voltage induced at shutoff can be reduced via a free-wheeling diode as well as via a so-called rapid-extinction diode. In this case there is a provision to make switching on the free-wheeling diode and the rapid-extinction diode depend on the rotational speed of the internal combustion engine for example. At low rotational speeds, the induced voltage is provided to be reduced exclusively via the free-wheeling diode. With increasing rotational speeds, the duration over which the free-wheeling diode is operated is shortened such that the rapid-extinction diode is switched on earlier and earlier. At high rotational speeds, the voltage extinction occurs only via the rapid-extinction diode.

For higher rotational speeds and/or a greater number of drive cams of the pumping device, the switching periods are shortened and the extinction must accordingly occur rapidly. The more rapid extinction may be achieved for example using an increased extinction voltage via a Zener diode. With a higher extinction voltage, however, the power loss at the Zener diode or at a parallel-connected transistor increases disproportionately. Since engine control units, however, typically lie at the upper limit with respect to power loss, in the case of a rapid extinction, the housing of the control unit must be enlarged so as to be able to dissipate the higher power loss to the surroundings of the control unit. The increase of the size of the control unit results in significant additional costs.

SUMMARY OF THE INVENTION

The device according to the present invention and the method according to the present invention have the advantage that the device for triggering an inductor has a trigger circuit and a first and second extinguishing device, and the trigger circuit establishes or interrupts a current flow to the inductor via a switch element, the trigger circuit, in the interruption of the current flow to the inductor, operating initially the first extinguishing device for the duration of a free-wheeling extinction time and subsequently operating the second extinguishing device, the first and second extinguishing devices extinguishing a current induced in the inductor, and the second extinguishing device extinguishing the induced current more rapidly than the first extinguishing device, the free-wheeling extinction time advantageously not falling below a minimum time.

This in particular has the advantage that the establishment of a minimum time ensures that a portion of the induced current in the inductor or coil or solenoid valve is already extinguished by the first extinguishing device. This advantageously ensures that the second extinguishing device only has to extinguish a reduced induced current.

Parallel to an inductor, the circuit configuration according to the present invention for implementing the method according to the present invention provides for a switchable Zener element and a free-wheeling diode in series, the switchable Zener element comprising at least one switch element and one Zener diode. This has the advantage that the circuit is designed in a very compact and reliable manner and that a switchable Zener element is designed from the Zener diode and the switch element, which controls a current flow via the switch element quasi independently.

It is especially advantageous if the second extinguishing device is operated only when the induced current falls below a specified extinction current threshold value. This ensures in an advantageous manner that the first extinguishing device initially extinguishes the high current component and that the second extinguishing device is operated only when the induced current falls below a threshold value such that the second extinguishing device always begins the extinction with a specified current value.

It is especially advantageous that the extinction current threshold value or the minimum time, after which the switch is made from the first to the second extinguishing device, is defined in such a way that a specified maximum quantity of heat that is allowed to arise at a maximum in the operation of the second extinguishing device is not exceeded. The establishment of the minimum time or the extinction current threshold value with the aid of a specified or desired quantity of heat, which is allowed to arise at a maximum in the operation of an extinguishing device, makes it possible in an advantageous manner to protect for example a control unit against thermal overload.

Furthermore it is advantageous if the first extinguishing device comprises at least one diode and the second extinguishing device at least one Zener diode. Thus the current can be reduced or extinguished via the first extinguishing device having a first voltage, for example a free-wheeling extinction voltage U_LF=0.6 to 0.8 V, and using a second extinguishing device having a second voltage, for example a Zener voltage.

A further suitable refinement provides for the first extinguishing device to comprise at least one switch element and the second extinguishing device at least one diode such that it is possible advantageously to implement a procedure according to the present invention without special expenditure in components.

The present invention provides for the extinction voltage to be increased by the operation of the second extinguishing device with the advantage that the induced current can be extinguished more quickly by specifying a higher extinction voltage.

Finally, another refinement provides for a circuit configuration in which a switch element of the switchable Zener element has a first, second and third terminal, and the electrical connection between the first and the second terminals occurs as a function of the potential applied at the third terminal, and a Zener diode is arranged between the third terminal and the first terminal. This configuration has the advantage that by changing the triggering potential it is possible to switch between two extinguishing devices in a simple manner and that a quasi linear control of the switch element is implemented with the aid of the Zener diode, which extinguishes the induced current rapidly in an advantageous manner.

DETAILED DESCRIPTION

The present invention is based on the consideration of rapidly extinguishing the induced voltage in the interruption of the current flow to an inductor, but to let the production of heat by the power loss of the components occur, as much as possible, outside of the triggering device, that is, for example, a control unit.

The current extinction according to the present invention is a combination of slow and rapid extinction.

Figure 1:
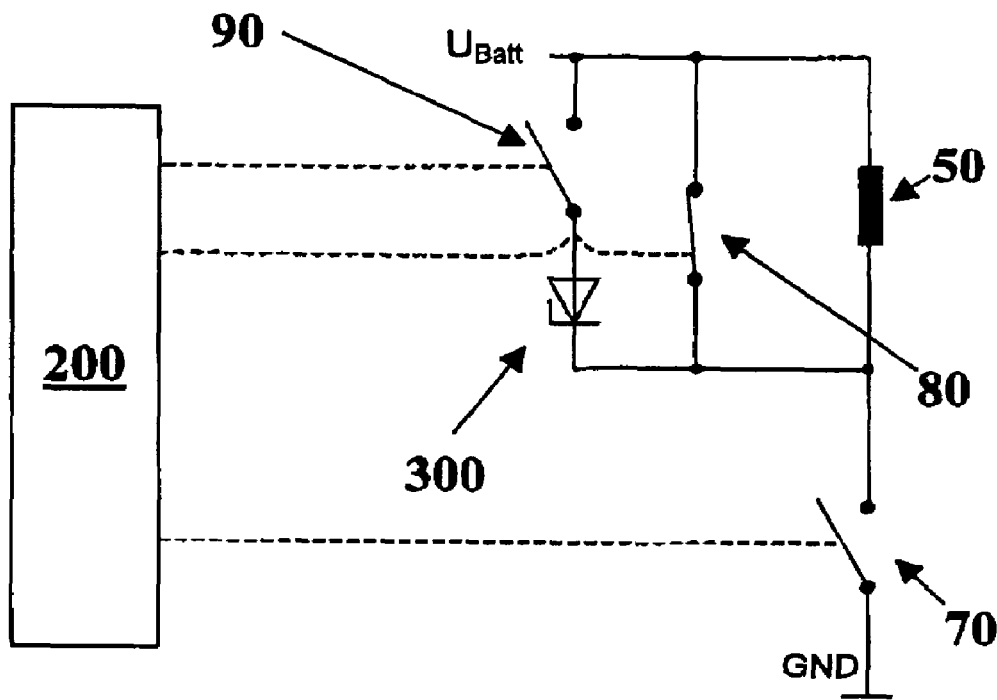
FIG. 1 shows a schematic representation of a device for triggering an inductor.

FIG. 1 schematically shows an embodiment of a device according to the present invention for triggering an inductor 50. Inductor 50, which in the following is also referred to as solenoid valve 50, is connected by a first terminal end to a supply line, which in the present exemplary embodiment is at battery potential. The other second terminal end is connected to a ground potential GND via a switch element 70. Parallel to solenoid valve 50 there is a switch element 80 as well as a switch element 90 and a Zener diode 300. A trigger circuit 200 is connected to switch elements 70, 80 and 90 via control lines.

By closing or opening switch element 70, solenoid valve 50 is either connected to the ground potential or disconnected from it, i.e. switch element 70 switches solenoid valve 50 on or off. During the triggering of solenoid valve 50, switch elements 80 and 90 are open.

Following the switching off of solenoid valve 50, the second terminal end of solenoid valve 50 is connected to the battery potential by closing switch element 80. Subsequently, the current flowing through solenoid valve 50 is slowly extinguished or reduced—the extinction voltage being practically zero. The power loss occurs essentially in the inductor, that is, in solenoid valve 50, and is there dissipated as heat to the environment.

After a certain period of time, which is greater or equal to a minimum time according to the present invention, or when a current threshold is undershot, switch element 80 is opened and switch element 90 is closed. Due to Zener diode 300 being switched in parallel to solenoid valve 50, an additional extinction voltage is applied. The current reduction now proceeds at a distinctly faster rate. Since the current has already decayed as much as possible, the share of the rapid extinction in the extinction process as a whole is low. Accordingly, the power loss at Zener diode 300 is low as well.

On the whole, what is achieved using the stepped extinction is that the energy/power loss in the control unit rises only insignificantly, while the current, however, is completely reduced within a desired time.

In the present exemplary embodiment according to FIG. 1, the electrical connection via switch element 80 represents a first extinguishing device. The electrical connection via switch element 90 and Zener diode 300 acts as a second extinguishing device. Optionally, the first extinguishing device may comprise additional components. Preferably, a free-wheeling diode could also be provided in the first extinguishing device. In this case, extinction initially occurs via the free-wheeling diode and subsequently via the Zener diode.

Figure 2:
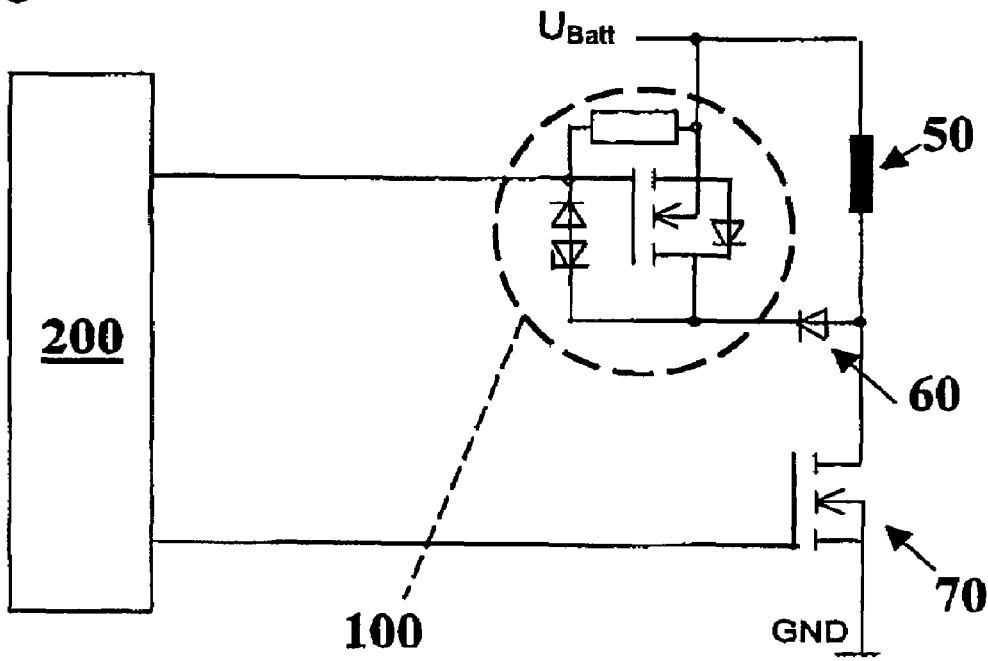
FIG. 2 shows a preferred device for triggering an inductor.

A preferred device for triggering an inductor is shown in FIG. 2. The inductor or solenoid valve 50 is connected by a first terminal end to a supply line, which in the present exemplary embodiment is at battery potential. The other, second terminal end is connected to a ground potential GND via a switch element 70. Parallel to solenoid valve 50, a free-wheeling diode 60 and a switchable Zener element 100 are arranged in series. The anode of free-wheeling diode 60 is connected to the second terminal lead of solenoid valve 50, while the cathode is connected to switchable Zener element 100. Another terminal connects Zener element 100 to the supply potential and a third terminal to a control potential of a trigger circuit 200. Trigger circiuit 20 additionally triggers switch element 70 via an additional line.

By closing or opening switch element 70, solenoid valve 50 is either connected to the ground potential or disconnected from it, i.e. switch element 70 switches solenoid valve 50 on and off. After solenoid valve 50 is switched off, free-wheeling diode 60 is initially connected to the battery potential via switchable Zener element 100.

Figure 3:
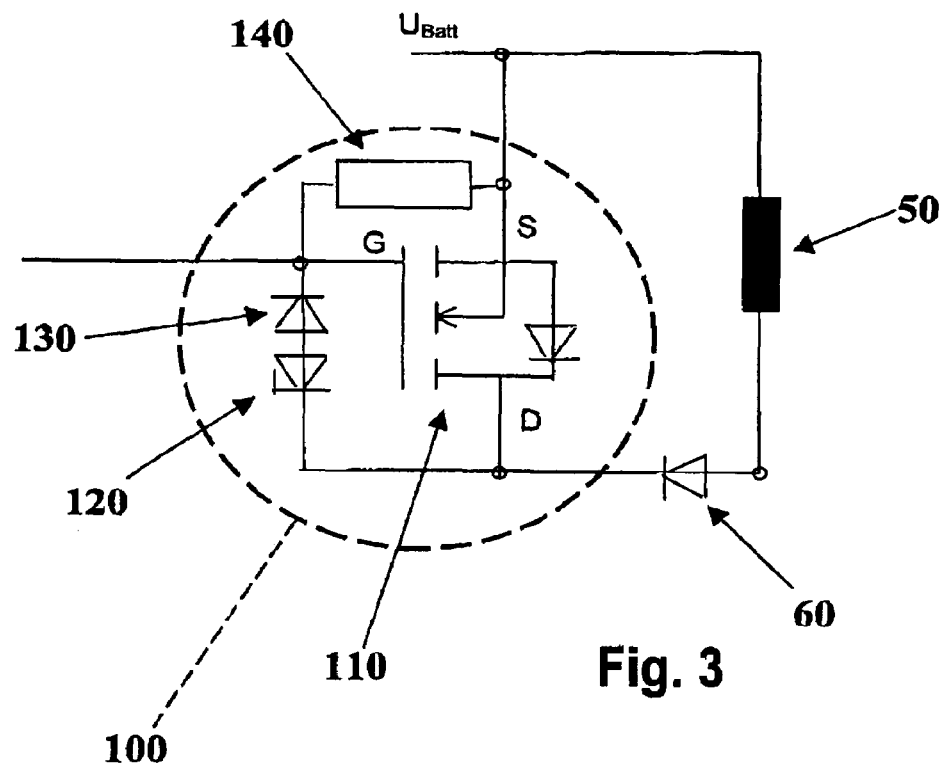
FIG. 3 shows the detail of a switchable Zener element of the preferred circuit configuration from FIG. 2.

FIG. 3 shows switchable Zener element 100 of the preferred circuit configuration from FIG. 2 in detail. As already described under FIG. 2, free-wheeling diode 60 and switchable Zener element 100 are arranged in series parallel to solenoid valve 50. Switchable Zener element 100 comprises a switch element 110, a diode 130, a Zener diode 120 and a resistor 140. Switch element 110 has a first, second and third terminal D, S, G, there being the possibility of establishing or interrupting an electrical connection between the first and second terminal D, S as a function of a potential applied to third terminal G. Resistor 140 is situated between second and third terminals S, G, the third terminal being at the potential of the supply voltage and the second terminal being at the potential of triggering trigger circuit 200. Between third and first terminals G, D, diode 130 and Zener diode 120 are connected in series, the cathode of diode 130 being connected to third terminal G and the cathode of Zener diode 120 being connected to second terminal D. Second terminal D is additionally connected to the cathode of free-wheeling diode 60, the anode of free-wheeling diode 60 being connected to the second terminal of inductor 50.

By selecting a suitable trigger potential at third terminal G of switch element 110, an electrical circuit is formed between first and second terminals D, S and thus the cathode of free-wheeling diode 60 is connected electrically to the battery potential. On the basis of the existing trigger potential, a current flow via diode 130 and Zener diode 120 is prevented.

If the trigger potential at third terminal G is changed in such a way that the electrical circuit between first and second terminals D, S is opened again, then there exists a trigger potential which allows for a current flow via diode 130 and Zener diode 120. The cathode of free-wheeling diode 60 thus no longer has supply voltage applied to it, but rather lies essentially at a potential specified by Zener diode 120. Via Zener diode 120, however, third terminal G of switch element 110 is again triggered such that the extinction current is able to flow principally via switch element 110 via first and second terminals D, S to the supply source. The circuit acts quasi as a linear controller.

In the present exemplary embodiment according to FIGS. 2 and 3, the electrical connection of free-wheeling diode 60 via switch element 110 represents a first extinguishing device. Free-wheeling diode 60 together with transistor 110 in connection with the Zener diode acts as a second extinguishing device. The magnitude of the Zener voltage is determined by the Zener diode, the forward voltage and the transistor threshold voltage. Switchable Zener element 100 is thus essentially used to provide different extinction voltages.

Figure 4:
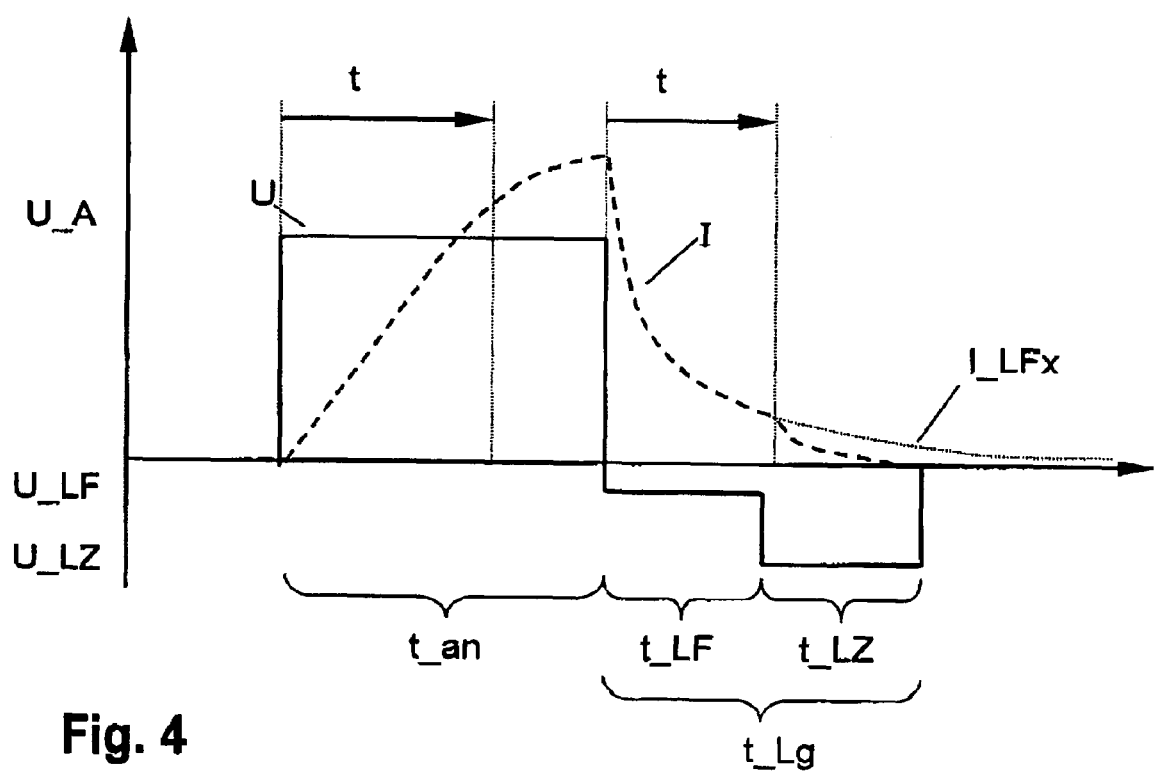
FIG. 4 shows a schematic representation of the time characteristic of current and voltage in a triggering of an inductor according to the present invention.

FIG. 4 shows schematically the triggering of solenoid valve 50 shown in FIGS. 2 and 3 with a subsequent extinction, which initially occurs via free-wheeling diode 60 and subsequently via Zener diode 120 of switchable Zener element 100. As soon as solenoid valve 50 is connected to the ground potential via switch element 70, the current flowing through the coil of the solenoid valve rises in a characteristic manner. By opening switch element 70 following a trigger time t_an, the coil current does not continue to flow to the ground potential, but rather, when switch element 110 is switched-through, via free-wheeling diode 60 to the battery potential. At the second terminal end of solenoid valve 50, a free-wheeling extinction voltage U_LF is applied. When undershooting a specific extinction current threshold or at or above a specific free-wheeling diode extinction time t_LF, a Zener diode extinction voltage U_LZ is applied to third terminal G of switch element 110 via trigger circuit 200, and the extinction of the solenoid valve no longer occurs against the battery potential, but rather against Zener diode extinction voltage U_LZ.

For this purpose, the extinction current threshold or free-wheeling diode extinction time t_LF must be selected in such a way that the current to be extinguished by the second extinguishing device heats the second extinguishing device only up to a maximum tolerable temperature. The maximum tolerable temperature in this instance does not necessarily depend on a maximum allowable temperature of components in the extinguishing device, but rather particularly additional devices and cooling possibilities in the surroundings of the second extinguishing device must be considered as well. Since the second extinguishing device is preferably located in a control unit, the cooling possibilities of the control unit and other components must be taken into consideration as heat sources. The maximum quantity of heat, which may be emitted by the second extinguishing device, must thus be determined in such a way that the cooling possibilities of the control unit are not exceeded and that the temperature to be expected does not jeopardize the operation of the control unit.

The extinction current threshold value must now be established in such a way that the specified maximum tolerable quantity of heat of the second extinguishing device is not exceeded. The same applies to the free-wheeling diode extinction time t_LF, which must not fall below a minimum time, the minimum time being established in such a way that following an operation of the first extinguishing device for the duration of the minimum time, the remaining current to be extinguished is so low that the maximum tolerable quantity of heat for the second extinguishing device is not exceeded.

According to a preferred specific development, switch element 70 takes the form of a lowside switch and switches the solenoid valve on and off. When switching off, the magnetically stored energy in the free-wheeling circuit is extinguished, first in free-wheeling diode 60 and subsequently in free-wheeling diode 60 and in Zener diode 120. For this purpose, switch element 110 in Zener element 100 may be implemented for example by a power MOS transistor, as indicated in FIG. 3 by switch element 110 having a parasitic diode that is not identified in detail. Due to its low Zener voltage, Zener diode 120 is connected preferably parallel to solenoid valve 50. This has the further advantage that in the extinction process only the energy stored in the solenoid circuit must be reduced. By contrast, in an extinction in series, additionally energy from the battery would be reduced as well.

In the start phase of the extinction, the power MOS transistor is completely switched through such that only the free-wheeling diode extinction voltage is active. Following the expiration of the free-wheeling diode extinction time t_LF or when a specific current threshold is undershot, the power MOS transistor is no longer actively triggered such that its drain voltage rises until the diode chain between its drain and source again triggers the transistor up to the Zener voltage.

In principle, the electrical design may differ from the exemplary embodiments shown so far. Essentially, the circuit design is to be selected in such a way that, during the extinguishing process, a first extinguishing device supplies a first extinction voltage to the inductor, while a second extinguishing device supplies a second extinction voltage to the inductor.

Thus it is also conceivable that the first and second extinguishing devices are designed as independent circuits, which exhibit a different current-voltage characteristic during the extinguishing process.

What is claimed is:

1. A device for triggering an inductor comprising:
a first extinguishing device;
a second extinguishing device; and
a trigger circuit for triggering a switch element, which one of establishes and interrupts a current flow to the inductor, the trigger circuit, in the interruption of the current flow to the inductor, initially operating the first extinguishing device, and, following a free-wheeling extinction time, operating the second extinguishing device,
wherein the first and second extinguishing devices extinguish a current induced in the inductor,
wherein the second extinguishing device extinguishes the induced current more rapidly than the first extinguishing device, and
wherein the free-wheeling extinction time does not fall below a minimum time.

2. The device according to claim 1, wherein the second extinguishing device is operated only when the induced current falls below a specified extinction current threshold value.

3. The device according to claim 1, wherein a maximum quantity of heat, which arises in the operation of the second extinguishing device, is specified, and one of an extinction current threshold value and the minimum time is established on the basis of the maximum quantity of heat.

4. The device according to claim 1, wherein the first extinguishing device includes at least one diode, and the second extinguishing device includes at least one Zener diode.

5. The device according to claim 1, wherein the first extinguishing device includes at least one switch element, and the second extinguishing device includes at least one diode.

6. The device according to claim 1, wherein an extinction voltage is increased by the operation of the second extinguishing device.

7. A method for triggering an inductor comprising:
following an interruption of a current flow to the inductor, initially operating a first extinguishing device for a duration of a free-wheeling extinction time; and
subsequently operating a second extinguishing device,
wherein the first and second extinguishing devices extinguish a current induced in the inductor,
wherein the second extinguishing device extinguishes the current more rapidly than the first extinguishing device, and
wherein the free-wheeling extinction time does not fall below a minimum time.

8. The method according to claim 7, wherein the inductor is a solenoid valve in a fuel supplying device.

9. The method according to claim 7, wherein the second extinguishing device is operated only when the induced current falls below a specified extinction current threshold value.

10. The method according to claim 7, wherein a maximum quantity of heat, which arises in the operation of the second extinguishing device, is specified, and one of an extinction current threshold value and the minimum time is established on the basis of the maximum quantity of heat.

11. The method according to claim 7, wherein the first extinguishing device includes at least one diode, and the second extinguishing device includes at least one Zener diode.

12. The method according to claim 7, wherein the first extinguishing device includes at least one switch element, and the second extinguishing device includes at least one diode.

13. The method according to claim 7, wherein an extinction voltage is increased by the operation of the second extinguishing device.

14. A circuit configuration for reducing an induced current in an inductor, comprising:
a switchable Zener element including at least one switch element and one Zener diode; and
a free-wheeling diode,
wherein the switchable Zener element and the free-wheeling diode are arranged in series with respect to each other, and parallel to the inductor.

15. The circuit configuration according to claim 14, wherein the switch element of the switchable Zener element has a first, second and third terminal, an electrical connection between the first and second terminals occurs as a function of a potential applied at the third terminal, and the Zener diode is situated between the third terminal and the first terminal.

* * * * *